US005460818A

United States Patent [19]
Park et al.

[11] Patent Number: 5,460,818
[45] Date of Patent: Oct. 24, 1995

[54] COMPATIBILIZED BLEND OF OLEFINIC POLYMERS AND MONOVINYLIDENE AROMATIC POLYMERS

[75] Inventors: Chung P. Park, Sinzheim, Germany; George P. Clingerman, Newark, Ohio; Francis J. Timmers, Midland, Mich.; James C. Stevens, Richmond, Tex.; David E. Henton, Midland, Mich.

[73] Assignee: The Dow Chemical Company, Midland, Mich.

[21] Appl. No.: 226,533

[22] Filed: Apr. 12, 1994

[51] Int. Cl.$^6$ .................. C08L 25/04; C08L 23/04; C08L 23/10

[52] U.S. Cl. .................. 426/415; 426/397; 53/140; 53/396; 53/461; 521/59; 525/86; 525/205; 525/207; 525/218; 525/221; 525/227; 525/238; 525/240; 525/241

[58] Field of Search .................. 525/240, 241, 525/86, 205, 207, 218, 221, 227, 238; 521/59; 426/397, 415; 53/140, 396, 461

[56] References Cited

U.S. PATENT DOCUMENTS

| | | | |
|---|---|---|---|
| 3,117,945 | 1/1964 | Gorham | 525/240 |
| 3,117,946 | 1/1964 | Gorham | 525/240 |
| 3,851,015 | 11/1974 | Agouri et al. | |
| 3,980,736 | 9/1976 | Agouri et al. | |
| 4,020,025 | 4/1977 | Zeitler et al. | |
| 4,031,166 | 6/1977 | Bronstert et al. | |
| 4,188,432 | 2/1980 | Holden et al. | 428/35 |
| 4,386,187 | 5/1983 | Grancio et al. | 525/96 |
| 4,386,188 | 5/1983 | Grancio et al. | 525/96 |
| 4,690,976 | 9/1987 | Hahnfeld | 525/70 |
| 4,716,197 | 12/1987 | Seiss et al. | 525/75 |
| 5,260,394 | 11/1993 | Tazaki | 526/347 |

FOREIGN PATENT DOCUMENTS

| | | |
|---|---|---|
| 0060524 | 9/1982 | European Pat. Off. |
| 0060525 | 9/1982 | European Pat. Off. |
| 48-43031 | 6/1973 | Japan |
| 49-28637 | 3/1974 | Japan |
| 56-38338 | 4/1981 | Japan |
| 56-36534 | 4/1981 | Japan |
| 1363466 | 8/1974 | United Kingdom |

OTHER PUBLICATIONS

C. Wei–Berk; "Crystallization Behaviors of PP/PS Blends and Alloys"; *Polymeric Materials Sci. and Eng.* vol. 68 Spring 1993; pp. 299–301.

Polym. Eng. & Sci., Polymer Blends and Alloys, 21(5), pp. 985–995 (1981).

J. Polym. Sci.: Polym. Phys. Ed., vol. 20, pp. 2209–2217 (1981).

J. Polym Sci.: Polym. Letters Ed., vol. 19, pp. 79–84 (1981).

Polymer, Dynamic Mechanical Properties of Polystyrene/Low Density Polyethylene Blends, 21, p. 1469 (1980).

J. Appl. Polym. Sci., vol. 17, pp. 2597–2617 (1973).

Polymer, vol. 18, pp. 69–72 (1977).

Antec '92 Conference Proceedings, Society of Plastic Engineers, Detroit, pp. 2635–2638, (1992).

J. Polym. Sci.: Polym. Phys. Ed., vol. 19, pp. 1269–1272 (1981).

Eur. Polym. J., vol. 19, pp. 81–84 (1983).

J. Appl. Polym. Sci., vol. 26, pp. 1–8, (1981).

Polymer Blends, Ezio Martuscelli, Ed. 201, (1981) (Cover sheet only attached).

Polymer Blends and Alloys Technology, vol. 13, Technomic Publishing Co., p. 117 (1992).

*Primary Examiner*—David Buttner

[57] ABSTRACT

A polymer blend composition comprising:

(a) from 0.5 to 99 percent by weight, based on the total weight of (a), (b), and (c), of an aliphatic α-olefin homopolymer or interpolymer, or an interpolymer of an α-olefin and a non-aromatic monomer interpolymerizable therewith;

(b) from 0.5 to 99 percent by weight, based on the total weight of (a), (b), and (c), of a homopolymer or interpolymer of monovinylidene aromatic monomers, or an interpolymer of monovinylidene aromatic monomer and a monomer interpolymerizable therewith other than an aliphatic α-olefin; and (c) from 0.5 to 99 percent by weight, based on the total weight of (a), (b), and (c), of a substantially random interpolymer comprising an α-olefin and a vinylidene aromatic monomer. An expandable composition, comprising such polymer blend composition and an expanding agent; a foamed composition obtained by subjecting such an expandable composition to a foaming process; an article of manufacture molded from such a polymer blend composition; and a method of packaging using such a polymer blend composition.

31 Claims, No Drawings

COMPATIBILIZED BLEND OF OLEFINIC POLYMERS AND MONOVINYLIDENE AROMATIC POLYMERS

This invention relates to a polymer blend comprising an olefinic polymer, a monovinylidene aromatic polymer and a compatibilizer. The invention further relates to an expandable composition comprising such a polymer blend composition and an expanding agent, to a foamed composition obtained by subjecting such an expandable composition to a foaming process, to an article of manufacture molded from the polymer blend composition, and to a method of packaging a substance or article by using the polymer blend composition.

BACKGROUND OF THE INVENTION

Monovinylidene aromatic polymers such as polystyrene and rubber-modified polystyrene are very easily thermoformed and exhibit impact strength and low temperature properties when thermoformed. Thermoforming is a process whereby a resin sheet or preform which is heat softened to a temperature below the temperature at which the resin is completely molten or plastified, is formed into the desired shape by an applied pressure or vacuum. However, monovinylidene aromatic polymers with a high degree of crystallinity are brittle and can be thermoformed only at high temperatures. Monovinylidene aromatic polymers are known to have poor environmental stress crack resistance. Environmental stress cracking occurs when molded resin parts are subjected to conditions where the part is both placed under stress and exposed to an oil- or grease-containing substance. These conditions occur commonly where materials such as grease- or oil-containing foods are packaged in a molded container. The presence of the grease or fat in the food in combination with the stress placed on the container, associated with filling, sealing and handling, cause such containers to become weakened and easily damaged.

Olefinic polymers, such as polyethylene, polypropylene, and the like have relatively good resistance to the actions of oils and greases and, therefore, are very desirable for the manufacture of containers for foods and similar materials. When it comes to manufacturing or forming techniques, however, olefinic polymers are much less versatile than monovinylidene aromatic polymers. Olefinic polymers are very difficult to thermoform due to their low glass transition temperature and relatively sharp melting point at elevated temperature.

It is desirable to combine the toughness and solvent resistance of olefinic polymers with the high modulus and thermoformability of monovinylidene aromatic polymers by blending the two resins. Blending of monovinylidene aromatic and olefinic polymer resins is, however, complicated by the incompatibility of the two resins. Attempts to solve the incompatibility problem have focused on the use of specified amounts of the two resins and also on the use of a so-called compatibilizer.

Compatibilizers for blends of olefinic polymers and monovinylidene aromatic polymers proposed heretofore include:

graft copolymers of polystyrene and polyethylene, see for example *Polymer* 18, 69 (1977), *J. Appl. Polym. Sci.* 17, 2597 (1973), *Polymer* 21, 1469 (1980), U.S. Pat. Nos. 4,690,976, and 4,716,197;

graft copolymers of polystyrene and EPDM rubber, see for example *J. Appl. Polym. Sci.* 17, 2597 (1973), ANTEC '92 Conference Proceedings, Society of Plastic Engineers, May 3–7, Detroit 2635 (1992);

di-block copolymers of styrene-diene, see for example JP-A-48-43,031, JP-A-49-28,637, U.S. Pat. No. 4,031,166, EP-A-0,060,524, and EP-A-0,060,525;

hydrogenated di-block copolymers of styrene-diene, see for example *Polymer Blends,* E. Martuscelli, Ed. 201 (1981), *J. Polym. Sci.:* Polym. Letters, Ed. 19, 79 (1981), *J. Polym. Sci.:* Polym. Phys. Ed. 19, 1269 (1981), and *J. Polym. Sci.:* Polym. Phys. Ed. 20, 2209 (1982), GB-A-1,363,466, DD-A-241,375, U.S. Pat. No. 4,020,025, and JP-A-81-38,338;

block copolymers of styrene-ethylene, see for example U.S. Pat. Nos. 3,980,736 and 3,851,015;

tri-block copolymers of styrene-diene-styrene, see for example *Eur. Polym. J.* 19, 81 (1983), and U.S. Pat. Nos. 4,386,187 and 4,386,188;

hydrogenated tri-block copolymers of styrene-diene-styrene, see for example ANTEC '92 Conference Proceedings, ibid., EP-A-0,060,525, U.S. Pat. No. 4,188,432, *Polym. Eng. & Sci.* 21(5), 985 (1981), *J. Appl. Polym. Sci.* 26, 1 (1981), and *Polymer Blends and Alloys Technology,* Vol. 3, Technomic Publishing Co., 117 (1992); and an elastomer comprising styrene and a diene hydrocarbon monomers on the main chain of polymer, which monomers are distributed heterogeneously microscopically but homogeneously macroscopically. Such elastomer can be obtained by polymerizing styrene and a diene in the presence of a lithium based catalyst to produce copolymer which is then further added to a mixture of the monomers and continued to be copolymerized, see JP-56-36,534.

It is commonly hypothesized that compatibilization between two immiscible or incompatible polymers can be effected by a compatibilizer which improves adhesion between the polymer interfaces. It is further hypothesized, that for good adhesion the compatibilizer must have molecular segments which are miscible with the respective polymer domains. This would require the compatibilizer to have certain blocks of structures compatible with the respective polymer domains. For this reason, the compatibilizers proposed heretofore generally are grafted copolymers or block copolymers. The block copolymers containing unsaturated bonds in the polymer backbone lack resistance to thermal oxidation and ultraviolet light, presenting difficulties during processing and while the article is in use. Adding large amounts of antioxidant reduces the processing problem but will lead to the antioxidant migrating to the surface of fabricated articles, thereby deteriorating the aesthetics of the article. Saturated block copolymers having hydrogenated rubber blocks such as styrene-ethylene/butylene-styrene (SEBS) tri-block copolymers are more stable but in general not as effective compatibilizers as unsaturated ones. In addition, block copolymers and especially the hydrogenated block copolymers are expensive due to their high cost manufacturing process. Accordingly, there is still a desire for other low-cost compatibilizers which perform at least equally to or even better than existing compatibilizers. In addition there is a desire for compatibilizers which are resistant to oxidation and ultraviolet light, using decreased amounts of or no antioxidants.

There is also a desire for foamable or expandable materials which combine the properties of olefinic polymers and monovinylidene polymers in an expanded or foamed application.

SUMMARY OF THE INVENTION

The present invention provides a polymer blend composition comprising:

(a) from 0.5 to 99 percent by weight, based on the total weight of (a), (b), and (c), of an aliphatic α-olefin homopolymer or interpolymer, or an interpolymer of an aliphatic α-olefin and a non-aromatic monomer interpolymerizable therewith;

(b) from 0.5 to 99 percent by weight, based on the total weight of (a), (b), and (c), of a homopolymer or interpolymer of monovinylidene aromatic monomers, or an interpolymer of monovinylidene aromatic monomer and a monomer interpolymerizable therewith other than an aliphatic α-olefin; and (c) from 0.5 to 99 percent by weight, based on the total weight of (a), (b), and (c), of a substantially random interpolymer comprising an aliphatic α-olefin and a vinylidene aromatic monomer.

According to a further aspect the present invention provides an expandable composition comprising such a polymer blend composition and an expanding agent.

According to yet a further aspect, the present invention provides a foamed composition obtained by subjecting such an expandable composition to a foaming process.

The present invention also provides an article of manufacture molded from the present polymer blend composition.

According to another aspect there is provided a method of packaging a substance or article by providing an intimate blend of components (a), (b), and (c) of the present polymer blend composition and providing the blend in the form of an enclosure around or suitable for receiving a substance or article to be packaged.

DETAILED DESCRIPTION OF THE INVENTION

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering Groups.

The term "polymer" as used herein refers to a polymeric compound prepared by polymerizing one or more monomers. The generic term polymer thus embraces the term homopolymer, usually employed to refer to polymers prepared from only one monomer, and the term interpolymer as defined hereinafter.

The term "interpolymer" as used herein refers to polymers prepared by the polymerization of at least two different monomers. The generic term interpolymer thus embraces the terms copolymer, usually employed to refer to polymers prepared from two different monomers, and polymers prepared from more than two different monomers.

While describing in the present invention a polymer or interpolymer as comprising or containing certain monomers, it is meant that such polymers or interpolymers comprise or contain polymerized therein units derived from such a monomer. For example, if the monomer is ethylene $CH_2=CH_2$, the derivative of this unit as incorporated in the polymer is $—CH_2—CH_2—$.

While describing the invention in more detail blend component (a) may be referred to as an olefinic resin or polymer, blend component (b) as a monovinylidene aromatic resin or polymer, and blend component (c) as a compatibilizer.

The term "substantially random" in the substantially random interpolymer comprising an α-olefin and a vinylidene aromatic monomer as used herein means that the distribution of the monomers of said interpolymer can be described by the Bernoullian statistical model or by a first or second order Markovian statistical model, as described by J. C. Randall in POLYMER SEQUENCE DETERMINATION, Carbon-13 NMR Method, Academic Press New York, 1977, pp. 71–78. Preferably, the substantially random interpolymer comprising an α-olefin and a vinylidene aromatic monomer does not contain more than 15% of the total amount of vinylidene aromatic monomer in blocks of vinylidene aromatic monomer of more than 3 units. More preferably, the interpolymer is not characterized by a high degree of either isotacticity or syndiotacticity. This means that in the $^{13}$C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

The term "linear" as used herein means that the polymer does not have long chain branching. That is, the backbone of the polymer or interpolymer is unbranched or has only branches derived from the substituent(s) attached to the vinyl moieties of the monomers making up said polymer backbone.

The term "substantially linear" means that the backbone of the polymer or interpolymer is substituted with up to 3 long chain branches/1000 carbons, more preferably from about 0.01 long chain branches/1000 carbons to 1 long chain branches/1000 carbons, and especially from about 0.05 long chain branches/1000 carbons to about 1 long chain branches/1000 carbons. The concept of substantially linear is defined in more detail in U.S. Pat. Nos. 5,272,236 and 5,278,272 which are incorporated herein by reference. A linear or substantially linear polymer is different from a polymer produced by a high pressure, free radical initiated polymerization process which is known to those skilled in the art to have numerous long chain branches.

Olefinic polymers suitable for use as component (a) in the blends according to the present invention are aliphatic α-olefin homopolymers or interpolymers, or interpolymers of an aliphatic α-olefin and a non-aromatic monomer interpolymerizable therewith. Preferred olefinic polymers for use in the present invention are homopolymers or interpolymers of an aliphatic, including cycloaliphatic, α-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Exemplary monomers which can be polymerized therewith include 1-butene, 4-methyl-1-pentene, 1-hexene, and 1-octene. The olefinic polymer components (a) may also contain, in addition to the α-olefin, one or more non-aromatic monomers interpolymerizable therewith. Such additional interpolymerizable monomers include, for example, diolefins, ethylenically unsaturated carboxylic acids (both mono- and difunctional) as well as derivatives of these acids, such as esters and anhydrides. Exemplary of such monomers are acrylic acid, methacrylic acid, vinyl acetate and, maleic anhydride. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than about 0.94 g/cc (ASTM D 792) and a melt index of from about 0.01 to about 100, and preferably from 0.1 to about 50 grams per 10 minutes (as determined by ASTM Test Method D 1238, condition I).

Another class is the linear olefin polymers which have an absence of long chain branching, as for example the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least about 0.94 grams per cubic centimeter (g/cc) as determined by ASTM Test Method D 1505, and a melt index (ASTM-1238, condition I) in the range of from about 0.01 to about 100, and preferably from 0.1 to about 50 grams per 10 minutes.

The heterogeneous LLDPE employed in the present composition generally has a density of from about 0.85 to about 0.94 g/cc (ASTM D 792), and a melt index (ASTM- 1238, condition I) in the range of from about 0.01 to about 100, and preferably from 0.1 to about 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl- 1-pentene, 1-hexene, and 1-octene.

A further class is that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using so-called single site catalysts in a batch reactor having relatively high olefin concentrations (as described in U.S. Pat. Nos. 5,026,798 and 5,055,438 (Canich). The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from about 0.85 to about 0.94 g/cc (ASTM D 792), and a melt index (ASTM- 1238, condition I) in the range of from about 0.01 to about 100, and preferably from 0.1 to about 50 grams per 10 minutes. Preferably the LLDPE is an interpolymer of ethylene and one or more other α-olefins having from 3 to 18 carbon atoms, more prefrably from 3–8 carbon atoms. Preferred comonomers include 1-butene, 4-methyl- 1-pentene, 1-hexene, and 1-octene.

Further, there is the class of substantially linear olefin polymers (SLOP) that may advantageously be used in component (a) of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,272,236 and 5,278,272 which are incorporated herein by reference.

The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as $I_2$), of the SLOP is generally from about 0.01 g/10 min to about 1000 g/10 min, preferably from about 0.01 g/10 min to about 100 g/10 min, and especially from about 0.01 g/10 min to about 10 g/10 min.

The SLOP can be a homopolymer of $C_2$–$C_{20}$ olefins, such as ethylene, propylene, 4-methyl-1-pentene, etc., or it can be an interpolymer of ethylene with at least one $C_3$–$C_{20}$ α-olefin and/or $C_2$–$C_{20}$ acetylenically unsaturated monomer and/or $C_4$–$C_{18}$ diolefin. SLOP can also be an interpolymer of ethylene with at least one of the above $C_3$–$C_{20}$ α-olefins, diolefins and/or acetylenically unsaturated monomers in combination with other unsaturated monomers.

Especially preferred olefin polymer components (a) comprise LDPE, HDPE, heterogeneous and homogeneous LLDPE, SLOP, polypropylene (PP), especially isotactic polypropylene and rubber toughened polypropylenes, or ethylene-propylene interpolymers (EP), or blends thereof.

The blends according to the present invention generally contain at least 0.5 percent by weight, preferably at least 20 percent by weight, most preferably at least 35 percent by weight, to generally 99 percent by weight, preferably to 80 percent by weight, most preferably to 75 percent by weight of olefinic polymer (a), based on the total weight of (a), (b), and (c).

Suitable monovinylidene aromatic polymers for use in component (b) of the present blends include homopolymers or interpolymers of a monovinylidene aromatic monomer, or an interpolymer of a monovinylidene aromatic monomer and a monomer interpolymerizable therewith other than an aliphatic α-olefin. Suitable monovinylidene aromatic monomers are represented by the following formula:

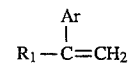

wherein $R_1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl. Exemplary monovinylidene aromatic monomers include styrene, para-vinyl toluene, α-methylstyrene, t-butyl styrene, chlorostyrene, including all isomers of these compounds, etc. Styrene is a particularly desirable monovinylidene aromatic monomer for the monovinylidene aromatic polymers used in the practice of the present invention.

Examples of suitable interpolymerizable comonomers other than a monovinylidene aromatic monomer include N-phenyl maleimide, acrylamide, ethylenically-unsaturated nitrile monomers such as acrylonitrile and methacrylonitrile, ethylenically-unsaturated mono- and difunctional carboxylic acids and derivatives thereof such as esters and, in the case of difunctional acids, anhydrides, such as for example acrylic acid, $C_{1-4}$-alkylacrylates or methacrylates, such as n-butyl acrylate and methyl methacrylate, maleic anhydride, etc. In some cases it is also desirable to copolymerize a cross-linking monomer such as a divinyl benzene into the monovinylidene aromatic polymer.

The interpolymers of monovinylidene aromatic monomers with other interpolymerizable comonomers preferably contain, polymerized therein, at least about 50 percent by weight and, preferably, at least 90 percent by weight of one or more monovinylidene aromatic monomers.

The monovinylidene aromatic polymers may be suitably modified by rubbers to improve their impact properties. Examples of suitable rubbers are homopolymers of $C_{4-6}$- conjugated dienes, especially butadiene or isoprene; interpolymers of one or more monovinylidene aromatic monomers and one or more $C_{4-6}$ conjugated dienes, especially butadiene or isoprene; interpolymers of ethylene and propylene or ethylene, propylene and a nonconjugated diene, especially 1,6-hexadiene or ethylidene norbornene; homopolymers of $C_{4-6}$ alkyl acrylates; interpolymers of $C_{4-6}$ alkyl acrylates and a interpolymerizable comonomer, especially a monovinylidene aromatic monomer or a $C_{1-4}$ alkyl methacrylate. Also included are graft polymers of the foregoing rubbery polymers wherein the graft polymer is a monovinylidene aromatic polymer. A preferred monovinylidene aromatic monomer for use in all of the foregoing rubbery polymers is styrene. A most preferred rubbery polymer is polybutadiene or a styrene/butadiene copolymer. The above rubbers may be prepared by anionic solution polymerization techniques or by free radically initiated solution, mass, emulsion or suspension processes. The rubbery elastomers prepared by emulsion polymerization may be agglomerated to produce larger particles having a bimodal or trimodal, etc. particle size distribution if desired.

Impact modified monovinylidene aromatic polymers are well known in the art and are commercially available. Suitable impact modified polymers are prepared by blending the rubbery polymer with previously prepared matrix polymer having the desired chemical composition, by graft polymerizing the matrix in the presence of a predissolved rubber, or by a combination of such techniques.

Preferred impact modified monovinylidene aromatic polymers are prepared by dissolving the rubber in the monomer or monomers, optionally in the presence of a solvent or diluent and polymerizing the resulting solution, desirably while agitating the solution so as to prepare a dispersed, grafted, impact modified polymer, having rubbery domains containing occlusions of matrix polymer dispersed throughout the resulting polymeric matrix. Such rubber modified polymers, known as mass or solution polymerized, high impact polymers, are previously well known in the art and are commercially available. Additional quantities of rubbery polymer, especially emulsion grafted rubbery polymers may be blended into the impact modified monovinylidene aromatic polymer if desired.

A highly preferred monovinylidene aromatic monomer is styrene and the impact modified polymer is high impact polystyrene. A very highly preferred high impact polystyrene is prepared by the solution or mass polymerization technique and contains from 5 to 15 (more preferably from 6 to 9) weight percent polybutadiene rubber. Most highly preferred high impact polystyrenes are those wherein the polystyrene matrix has a molecular weight from 60,000 to 225,000 (preferably from 100,000 to 225,000 and more preferably from 150,000 to 225,000). When measuring such molecular weights, the technique employed is that of gel permeation chromatography employing a polystyrene standard.

Suitable polymers to be employed as component (b) also include monovinylidene aromatic polymers having a high degree of syndiotactic configuration. By a high degree of syndiotactic configuration is meant that the stereochemical structure is mainly of syndiotactic configuration, i.e., the stereostructure in which phenyl groups or substituted phenyl group as side chains are located alternately at opposite directions relative to the main chain consisting of carbon-carbon bonds. Tacticity is quantitatively determined by the $^{13}C$-nuclear magnetic resonance method, as is well known in the art. Preferably, the degree of syndiotacticity as measured by $^{13}C$ NMR spectroscopy is greater than 75% r diad, more preferably greater than 90% r diad. Suitable examples of syndiotactic polymers include polystyrene, poly(alkylstyrene), poly(halogenated styrene), poly(alkoxystyrene), poly(vinylbenzoate), the mixtures thereof, and copolymers containing the above polymers as main components. Poly(alkylstyrene) includes poly(methylstyrene), poly(ethylstyrene) poly(isopropylstyrene), poly(tert-butylstyrene), etc., poly(halogenated styrene) includes, poly(chlorostyrene), poly(bromostyrene), and poly(fluorostyrene), etc. Poly(alkoxystyrene) includes, poly(methoxystyrene), poly(ethoxystyrene), etc.

The syndiotactic polymer used as component (b) usually has a weight-average molecular weight of 10,000 to 10,000,000, preferably 100,000 to 5,500,000 with a number-average molecular weight of 5,000 to 5,500,000, preferably 50,000 to 2,500,000. The syndiotactic polymer has a melting point of 160° to 310° C.

Preferred monovinylidene aromatic polymers for use as component (b) of the present invention include polystyrene, syndiotactic polystyrene, rubber-modified high impact polystyrene, poly(vinyl-toluene), and poly($\alpha$-methylstyrene).

The blends according to the present invention contain generally at least 0.5 percent by weight, preferably at least 10 percent by weight, more preferably at least 15 weight percent, to 99 percent by weight, preferably to 80 percent by weight, more preferably to 60 weight percent of monovinylidene aromatic polymer component (b), based on the total weight of (a), (b), and (c).

Blend components (c) for the polymer blend composition of the present invention are substantially random interpolymers comprising an aliphatic $\alpha$-olefin and a vinylidene aromatic monomer.

The aliphatic $\alpha$-olefin monomers contained in the compatibilizer component (c) include aliphatic and cycloaliphatic $\alpha$-olefins having from 2 to 18 carbon atoms, and preferably $\alpha$-olefins having from 2 to 8 carbon atoms. Most preferably, the aliphatic $\alpha$-olefin of compatibilizer component (c) comprises ethylene or propylene, preferably ethylene, optionally together with one or more other $\alpha$-olefins having from 3 to 8 carbon atoms, such as for example ethylene and propylene, or ethylene and octene, or ethylene and propylene and octene.

Suitable vinylidene aromatic monomers incorporated in component (c) are monovinylidene aromatic monomers represented by the following formula:

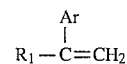

wherein $R_1$ and Ar are as previously defined. Suitable examples include styrene and lower alkyl- or halogen-substituted derivatives thereof. Preferred examples include styrene, $\alpha$-methyl styrene, the lower alkyl- or phenyl- ring substituted derivatives of styrene, such as ortho-, meta-, and para-methylstyrene, or mixtures thereof, and the ring halogenated styrenes. A more preferred monovinylidene aromatic monomer is styrene.

The compatibilizer component (c) useful in the present invention is preferably a pseudo-random linear or substantially linear, more preferably a linear interpolymer comprising an aliphatic α-olefin and a monovinylidene aromatic monomer. These pseudo-random linear interpolymers are described in U.S. Ser. No. 45,403 filed Jul. 3, 1990 (corresponding to EP-A- 0,416,815) which is incorporated herein by reference.

A particular distinguishing feature of pseudo-random interpolymers is the fact that all phenyl or substituted phenyl groups substituted on the polymer backbone are separated by two or more methylene units. In other words, the pseudo-random interpolymers comprising an α-olefin and vinylidenearomatic monomer can be described by the following general formula (using styrene as the hindered monomer and ethylene as the olefin for illustration):

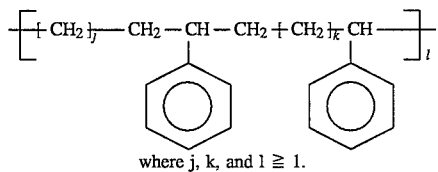

where j, k, and l ≧ 1.

It is believed that during the addition polymerization reaction of ethylene and styrene employing a catalyst as described hereinafter, if a hindered monomer (styrene) is inserted into the growing polymer chain, the next monomer inserted must be ethylene or a hindered monomer which is inserted in an inverted fashion. Ethylene, on the other hand, may be inserted at any time. After an inverted hindered monomer insertion, the next monomer must be ethylene, as the insertion of another hindered monomer at this point would place the hindering substituent too close to the previously inserted hindered monomer.

Most preferably the compatibilizer component (c) is a pseudo-random linear interpolymer comprising ethylene and styrene.

The content of units derived from the vinylidene aromatic monomer incorporated in the compatibilizer component (c), and preferably in the pseudo-random, linear interpolymer, preferably is at least 1.0 mole percent, more preferably from 1.5 to less than 55 mole percent, highly preferably from 3.0 to 50 mole percent, and most preferably from 15.0 to 35 mole percent.

Preferably, higher molecular weight interpolymer components (c) are used, such as possess a Mw of greater than 13,000. Also preferably such polymers possess a melt index (I$_2$), ASTM D-1238 Procedure A, condition E, of less than 125, more preferably from 0.01–100, even more preferably from 0.01 to 25, and most preferably from 0.05 to 6.

While preparing the substantially random interpolymer component (c), as will be described hereinafter, an amount of atactic vinylidene aromatic homopolymer may be formed due to homopolymerization of the vinylidene aromatic monomer at elevated temperatures. In general, the higher the polymerization temperature is, the higher is the amount of homopolymer formed. The presence of vinylidene aromatic homopolymer is in general not detrimental for the puposes of the present invention and may be tolerated. The vinylidene aromatic homopolymer may be separated from component (c), if desired, such as by extraction with a suitable extracting agent, for example acetone or chloroform. For the purpose of the present invention it is preferred that in component (c) no more than 20 percent by weight, based on the weight of component (c), more preferably less than 15 weight precent of vinylidene aromatic homopolymer is present.

The substantially random interpolymers may be modified by typical grafting, hydrogenation, functionalizing, or other reactions well known to those skilled in the art, provided their compatibilization function will not be substantially affected. The polymers may be readily sulfonated or chlorinated to provide functionalized derivatives according to established techniques.

The pseudo-random interpolymers can be prepared as described in U.S. Ser. No. 545,403 filed Jul. 3, 1990 (corresponding to EP-A-0,416,815). Preferred operating conditions for such polymerization reactions are pressures from atmospheric up to 3000 atmospheres and temperatures from 30° C. to 200° C. Polymerizations at temperatures above the autopolymerization temperature of the respective monomers may result in formation of some amounts of homopolymer polymerization products resulting from free radical polymerization.

Examples of suitable catalysts and methods for preparing the pseudo-random interpolymers are disclosed in U.S. application Ser. No. 545,403, filed Jul. 3, 1990 (EP-A-416, 815); U.S. application Ser. No. 547,718, filed Jul. 3, 1990 now abandoned (EP-A-468,651); U.S. application Ser. No. 702,475, filed May 20, 1991 now abandoned (EP-A- 514, 828); U.S. application Ser. No. 876,268, filed May 1, 1992, (EP-A-520,732), U.S. application Ser. No. 884,966, filed May 15, 1992 now U.S. Pat. No. 5,350,723 (corresponding to WO 93/23412), U.S. application Ser. No. 8,003, filed Jan. 21, 1993 now U.S. Pat. No. 5,374,696, U.S. application Ser. No. 34,434, filed Mar. 19, 1993 now U.S. Pat. No. 5,347, 034, U.S. application Ser. No. 82,197, filed Jun. 24, 1993 now abandoned, as well as U.S. Pat. Nos.: 5,055,438, 5,057,475, 5,096,867, 5,064,802, 5,132,380, and 5,189,192 all of which patents and applications are incorporated herein by reference.

The blends according to the present invention contain an effective amount of component (c) to achieve an improved dispersability of blend component (a) in blend component (b), or of blend component (b) in blend component (a), compared to blends of (a) and (b) without component (c). Thus, component (c) may be employed in an amount of at least 0.5, preferably of at least 1 percent by weight, more preferably at least 2 weight percent, to 99 percent by weight, preferably to 50 percent by weight, more preferably to 20 weight percent, based on the total weight of (a), (b), and (c). If the amount of (c) is too low, this will give a poor compatibility of (a) and (b) in the blend. If too high, the blend loses the desired stiffness derived from component (b).

Preferably, the blends according to the present invention comprise from 35 to 75 weight percent of (a), from 15 to 60 weight percent of (b), and from 2 to 20 weight percent of a pseudo-random interpolymer (c). According to a further preferred embodiment, in these blends (a) is selected from the group consisting of low density polyethylene, high density polyethylene, substantially linear polyethylene, linear low density polyethylene, and polypropylene, and (b) is selected from the group consisting of styrene homopolymer, rubber modified high impact polystyrene, poly(vinyl-toluene), and poly(α-methylstyrene).

According to another preferred embodiment, the blends according to the present invention comprise from 0 to 87 weight percent of (a), from 11 to 40 weight percent of syndiotactic polystyrene as (b), and from 2 to 20 weight percent of a pseudo-random, linear interpolymer comprising an α-olefin and a monovinylidene aromatic monomer (c). According to a further prefered embodiment, in these blends (a) comprises polypropylene.

The polymer blends of the present invention can be prepared by any conventional compounding operation, such as for example single and twin screw extruders, banbury mixers, brabender mixers, Farrel continuous mixers, and two roll mixers. The order of mixing and the form of the blend components to be mixed is not critical. The mixing temperatures are preferably such that an intimate blend is obtained of the components. Typical temperatures are above the softening or melting points of at least one of the components, and more preferably above the softening or melting points of all the components.

The polymer blends of the present invention may further comprise additives, such as for example fillers, antioxidants, process aids, colorants, UV stabilizers, flame retardants, additional elastomeric impact modifiers, etc.

The polymer blends of the present invention can be fabricated into films, sheet, moldings, foam sheet, and foam plank articles by conventional processes. Suitable processes include injection molding, compression molding, extruding, and thermoforming. An article may be prepared in a one-step preocess or two-step process. In a one-step process, the mixing and blending steps are combined and continuously performed on an apparatus having adequate mixing capability. In the two-step process, the blend is first prepared in a granular form by a suitable mixing and pelletizing means, and then subjected to a conventional fabrication process. By employing the present compatibilizer components (c) with their good dispersion properties, the more economical one-step process can be employed.

Sheet articles are typically extruded in one step and often subjected to thermoforming, such as for example described in U.S. Pat. No. 4,386,187, which is incorporated herein by reference. Film articles can be prepared by extrusion and thermoforming as well, but also by casting or film blowing. Blown films require a relatively homogeneously mixed blend, which preferably is prepared in a separate step. Foam sheet articles can be prepared as described in U.S. Pat. No. 4,020,025 incorporated herein by reference, which discloses a first step of blending the resin pellets, followed by extrusion of the foam sheet. Foam plank articles can be manufactured by the foam extrusion process. Injection moldings are typically manufactured in a two-step process, comprising a first blending step, followed by an injection molding step. In JP 48-43,031 a process is described to injection mold a foamed article by dry-blending a decomposable blowing agent with a granular blend followed by injection molding.

The polymer blends of the present invention can be used to make films such as label films, foams, especially packaging foams and toughened insulation foams, resilient expandable polymer beads, refrigerator liners, thermoformable sheet and other shaped articles by molding casting or the like process. The blends of the present invention are particularly useful in that they can be prepared from waste olefinic and monovinylidene aromatic resins, together with the pseudo-random interpolymer compatibilizer. This may provide an effective way to recycle waste polymeric materials.

According to a preferred aspect, the present invention provides an expandable composition comprising the polymer blend composition of the present invention and an expanding agent. With the term "expanding agent" is meant an agent or compound which while subjected to expanding condition, such as for example heating, change of pressure, or application of mechanical force, undergoes a change in its physical or chemical condition such as to occupy a greater volume. Preferred expanding agents are conventional blowing agents used to produce foams.

According to a preferred embodiment the expandable composition is in the form of beads.

Advantageously, there is provided a foamed composition obtained by subjecting the expandable composition to a foaming process. Preferably the foamed composition is in the form of a sheet or plank.

According to a further aspect, the present invention provides an article of manufacture molded from the polymer blend composition of the present invention. Preferably, the article of manufacture is obtained by thermoforming, extrusion, injection molding, or blow molding. Such an article of manufacture is preferably in the form of a sheet or film.

According to another aspect, the present invention provides a method of packaging a substance or article by providing an intimate blend of components (a), (b), and (c) of the present polymer blend composition and providing the blend in the form of an enclosure around or suitable for receiving a substance or article to be packaged. Optionally the combination of enclosure and material to be packaged may be subjected to a thermal and/or mechanical treatment to close or seal the packaged substance or article. This sealing or closing operation may be carried out under reduced pressure to provide a vacuum in the package. In this method the blend is preferably formed into a sheet or film and the substance or article to be packaged is food. In another preferred method the blend is formed into a container and the substance to be packaged is a liquid.

The invention will be further illustrated by the following examples, without limiting the invention thereto. Comparative examples are indicted with capital "C".

Melt Index values as given in the examples were measured according to ASTM D-1238 at 190° C. with a load of 2.16 kg.

Tensile strength values as given in the examples were measured according to ASTM D882-91, Method A.

Elongation values as given in the examples were measured according to ASTM D882-91, Method A, except that the gage length was 25.4 mm (1 inch) and the crosshead speed was 5 mm per minute.

Toughness values as given in the examples were tensile energies to break measured according to ASTM D882-91, Method A, except that the gage length was 25.4 mm (1 inch) and the crosshead speed was 5 mm per minute.

Modulus values as given in the examples were 2 percent secant moduli measured according to ASTM D882- 91, Method A, except that the gage length was 25.4 mm (1 inch) and the crosshead speed was 5 mm per minute The percentages of vinylidene aromatic monomer present in the pseudo-random interpolymer compatibilizers used in the polymer blends according to the present invention were determined by $^{13}C$ NMR spectroscopy. All percentages given are expressed by weight unless indicated otherwise.

EXAMPLES

Preparation of the Compatibilizer Component (C)

The compatibilizers used as component (c) in the polymer blends of the present invention were prepared by the following procedures.

Ethylene/styrene copolymers were made using (tert-butylamido)dimethyl(tetramethyl-$\eta^5$-cyclopentadienyl)silane dimethyltitanium(+4) catalyst and tris(pentafluorophenyl)borane cocatalyst in a one to one ratio according to the following procedure. A two liter stirred reactor was charged with the desired quantity of mixed alkane solvent (Isopar-E available from Exxon Chemicals Inc.) and the desired quantity of styrene comonomer. Hydrogen was added to the reactor by differential pressure expansion (pressure difference indicated by delta) from a 75 ml addition tank. The reactor was heated to the desired temperature and saturated with ethylene to the desired pressure. Catalyst and cocatalyst were mixed in a dry box by pipetting the desired amount of 0.005M solution of cocatalyst in Isopar-E or toluene into a solution of the catalyst in Isopar-E or toluene. The resulting solution was transferred to a catalyst addition tank and injected into the reactor.

The polymerization was allowed to proceed with ethylene on demand. Additional charges of catalyst and cocatalyst, if used, were prepared in the same manner and were added to the reactor periodically. After the run time, the polymer solution was removed from the reactor and quenched with isopropyl alcohol. A hindered phenol antioxidant (Irganox 1010 available from Ciba Geigy Corp.) was added to the polymer except for the preparation of ES-4 where tert-butyl catechol was used. Volatiles were removed from the polymers in a reduced pressure vacuum oven at about 120° C. for about 20 hours.

The preparation conditions for and the properties of the pseudo-random interpolymers are listed in Tables 1 and 2, respectively. The pseudo-random interpolymer compatibilizers were found to contain small amounts of amorphous polystyrene.

TABLE 1

Preparation of Pseudo-Random Interpolymer Components (C)

| Designation | Isopar-E (ml) | Styrene (ml) | Ethylene (MPa) | H2 (delta MPa) | Temp. (°C.) | Time (min.) | Catalyst (micromol) | Yield (g) |
|---|---|---|---|---|---|---|---|---|
| ES-1 | 500 | 500 | 1.48 | 0 | 80 | 80 | 20 | 73 |
| ES-2 | 500 | 500 | 1.48 | 0 | 80 | 50 | 20 | 87 |
| ES-3 | 500 | 500 | 1.48 | 0.07 | 80 | 20 | 3 | 45 |
| Es-4 | 500 | 500 | 2.17 | 0.07 | 80 | 30 | 5 | 51 |
| ES-5 | 500 | 500 | 1.83 | 0.07 | 80 | 20 | 5 | 70 |
| ES-6 | 500 | 500 | 2.17 | 0.07 | 80 | 20 | 4 | 67 |
| ES-7 | 500 | 500 | 1.14 | 0.07 | 80 | 20 | 6 | 58 |
| ES-8 | 500 | 500 | 0.79 | 0.52 | 90 | 30 | 18 | 53 |
| ES-9 | 500 | 500 | 0.79 | 0.07 | 80 | 20 | 9 | 48 |
| ES-10 | 500 | 500 | 0.79 | 0 | 80 | 30 | 12 | 59 |
| ES-11 | 590 | 420 | 0.45 | 0 | 80 | 30 | 25 | 86 |
| ES-12 | 500 | 500 | 0.45 | 0.07 | 60 | 30 | 15 | 115 |
| ES-13 | — | 840 | 0.45 | 0.10 | 60 | 30 | 20 | 96 |
| ES-14 | 500 | 500 | 0.79 | 0.55 | 80 | N.A. | 18 | 78 |
| ES-15 | 500 | 500 | 1.14 | 0.69 | 90 | N.A. | 16 | 76 |
| ES-16 | 500 | 500 | 1.31 | 0.69 | 90 | N.A. | 16 | 83 |
| ES-17 | 500 | 500 | 1.48 | 1.38 | 90 | N.A. | 13 | 72 |
| ES-18 | 500 | 500 | 1.65 | 1.38 | 90 | N.A. | 13 | 92 |

TABLE 2

Properties of Pseudo-Random Interpolymer Components (C)

| Design. | Styrene Content by mole (%) | by wt. (%) | Amorph PS (%) | Melt Flow Rate (dg/min.) |
|---|---|---|---|---|
| ES-1 | 20.1 | 48.3 | 4 | 0.20 |
| ES-2 | 20.1 | 48.3 | 4 | 0.26 |
| ES-3 | 12.4 | 34.5 | 1.7 | 0.21 |
| ES-4 | 6.6 | 20.8 | 1.6 | 2.60 |
| ES-5 | 7.4 | 22.9 | 0.4 | 0.40 |
| ES-6 | 8.4 | 25.4 | 2 | 0.14 |
| ES-7 | 17.8 | 44.6 | 1.9 | 0.74 |
| ES-8 | 22.2 | 51.4 | 4.3 | 12.1 |
| ES-9 | 24.9 | 55.2 | 2.2 | 3.62 |
| ES-10 | 26.5 | 57.3 | 2.6 | 1.52 |
| ES-11 | 34.3 | 66.0 | 5.2 | 13.1 |
| ES-12 | 41.0 | 72.1 | 1.4 | 1.07 |
| ES-13 | 47.3 | 76.9 | 5.2 | 0.92 |
| ES-14 | 31.4 | 63.0 | N.A. | 15.7 |
| ES-15 | 18.6 | 45.9 | N.A. | 4.0 |
| ES-16 | 16.3 | 42.0 | N.A. | 2.1 |
| ES-17 | 13.1 | 35.9 | N.A. | 6.3 |
| ES-18 | 11.7 | 33.9 | N.A. | 2 |

In the comparative examples the following compatibilizers, if any, were used:

KRATON G-1657 available from Shell Chemical Company, which is a mixture of diblock and triblock copolymers containing 13 weight percent styrene and having a melt index of 2.23;

KRATON G-1652 available from Shell Chemical Company, which is a styrene/ethylene-butylene/styrene-block copolymer containing 29 weight percent styrene;

VECTOR 6241-D available from Dexco Polymers, which is a styrene/butadiene/styrene (SBS) tri-block copolymer containing 43 weight percent styrene and having a melt index of 5.2; and STEREON 840A available from Firestone Synthetic Rubber and Latex Co., which is a styrene/butadiene (SB) di-block copolymer containing 43 weight percent styrene and having a melt index of 2.32.

Olefinic Polymer Components (A)

The olefinic polymer components (a) used in the examples are listed in Table 3.

TABLE 3

Olefinic Polymer Components (A)

| Polymer Designation | Density (g/cm³) | Melt Index (g/10 min.) | Remarks |
|---|---|---|---|
| LDPE 132i^A | 0.921 | 0.22 | |
| LDPE 681i^A | 0.922 | 1.20 | |
| LDPE 3 | 0.923 | 1.80 | |
| SLOP 1 | 0.919 | 1.82 | substantially linear ethylene/octene copolymer |
| SLOP 2 | 0.939 | 0.87 | substantially linear ethylene/octene copolymer |
| SLOP 3 | 0.884 | 1.88 | substantially linear ethylene/octene copolymer |
| HDPE 1 | N.A. | 0.54 | recycled HDPE |
| HDPE 2 | 0.963 | 0.69 | |
| HDPE 3 | 0.963 | 0.87 | |
| HDPE 4 | 0.952 | 0.05 | high molecular weight |
| EP 1 | | 2.63 | high melt strength ethylene/propylene random copolymer (appr. 2.0% ethylene) |
| EP 2 | | 0.8 | high melt strength ethylene/propylene random copolymer (appr. 2.0% ethylene) |
| Profax SD 613^B | 0.900 | 0.3 | high molecular weight rubber modified isotactic polypropylene |

^A Available from The Dow Chemical Company
^B Available from Himont U.S.A., Inc.

Monovinylidene Aromatic Polymer Components (B)

The monovinylidene aromatic polymer components (b) used in the examples are listed in Table 4.

TABLE 4

Monovinylidene Aromatic Polymer (B) Components

| Polymer Designation | Melt Index (g/10 min.) | Remarks |
|---|---|---|
| STYRON* 663[a] | 0.2 | general purpose polystyrene |
| STYRON 612[a] | 1.0 | general purpose polystyrene |
| GPPS 3 | 1.3 | general purpose polystyrene |
| GPPS 4 | 2.7 | general purpose polystyrene |
| GPPS 5 | 4.3 | general purpose polystyrene |
| STYRON 404[a] HIPS | 0.3 | high impact polystyrene |
| STYRON 469R[a] HIPS | 0.34 | high impact polystyrene |
| STYRON 478[a] HIPS | 0.76 | high impact polystyrene |
| PVT | 0.89 | Poly(vinyl toluene) |
| SBA | 3.45 | Styrene/butyl acrylate copolymer (11.8% BA) |
| SPS 1 | | Syndiotactic polystyrene about 300,000 Mw |
| SPS 2 | | Syndiotactic copolymer of 12 mole % paramethylstyrene, 88 mole % styrene about 220,000 Mw |
| SAN 111[a] | | styrene/acrylonitrile copolymer (31% acrylonitrile) |

[a] Available from The Dow Chemical Company
*STYRON is a trademark of The Dow Chemical Company

Preparation of the Polymer Blends

All blends, except where mentioned differently, were prepared on a Haake Rheocord Model 90 mixer, compressed on a hot press and tensile tested. Except for blends involving syndiotactic polystyrene (SPS), the blends were prepared at approximately the same conditions. A total of 40 g of granular resin mixture were melt blended in the Haake mixer for 15 minutes at 180° C. and 30 rpm rotor speed under a nitrogen atmosphere. The SPS/HDPE blends were mixed at 270° C. and pressed to sheet at 290° C. The thicknesses of the sheet ranged from about 0.7 mm to 1.1 mm varying from sheet to sheet. The sheet was cut to ½ inch (1.27 cm) wide strips by using a Thwing-Albert Model LDC-50 cutter. The cutter beneficially cuts the sheet to tensile specimens free of crazes at the edges by directing the crazes away from the strips. Tensile properties of the specimens were determined by using an Instron 1123 tensile tester at 5 mm/min crosshead speed and a 1 inch (2.54 cm) jaw span. Five specimens were run for each blend and the average value was reported as the representative value for the blend.

The toughness values were determined from the area under the tensile curves.

EXAMPLE 1

Polymer blends were prepared from STYRON 612 general purpose polystyrene and LDPE at various blending ratios, comparing compatibilizer ES-1 (invention) with KRATON G-1657 SEBS (comparative). The compositions of the blends as well as their properties are listed in Table 5.

TABLE 5

Polymer Blends

| Run No. | Component (A) LDPE 3 (wt. %) | Component (B) STYRON 612 (wt. %) | Component (C) Type | Component (C) Wt. % | Tensile Strength (MPa) | Elongation @ Break (%) | Toughness (MPa) | Modulus (MPa) |
|---|---|---|---|---|---|---|---|---|
| 1 | 47.5 | 50 | ES-1 | 2.5 | 17.4 | 25.4 | 3.5 | 338 |
| 2 | 45 | 50 | ES-1 | 5 | 17.4 | 31.7 | 4.5 | 331 |
| 3 | 40 | 50 | ES-1 | 10 | 18.1 | 39.5 | 6.1 | 322 |
| 4 | 30 | 50 | ES-1 | 20 | 15.7 | 80.1 | 10.8 | 261 |

TABLE 5-continued

| | Polymer Blends | | | | Tensile | Elongation | | |
| | Component (A) LDPE 3 | Component (B) STYRON 612 | Component (C) | | Strength | @ Break | Toughness | Modulus |
| Run No. | (wt. %) | (wt. %) | Type | Wt. % | (MPa) | (%) | (MPa) | (MPa) |
|---|---|---|---|---|---|---|---|---|
| 5 | 40 | 40 | ES-1 | 20 | 15.9 | 175.0 | 25.2 | 238 |
| 6 | 35 | 60 | ES-1 | 5 | 20.4 | 16.3 | 2.5 | 438 |
| 7 | 15 | 80 | ES-1 | 5 | 31.8 | 5.8 | 1.0 | 807 |
| C1 | 50 | 50 | — | — | 13.1 | 2.8 | 0.2 | 596 |
| C2 | 47.5 | 50 | Kraton G-1657 | 2.5 | 16.4 | 18.8 | 2.3 | 345 |
| C3 | 45 | 50 | Kraton G-1657 | 5 | 14.5 | 24.6 | 2.8 | 274 |
| C4 | 40 | 50 | Kraton G-1657 | 10 | 8.0 | 36.6 | 2.4 | 132 |
| C5 | 40 | 50 | Kraton G-1657 | 10 | 10.8 | 30.7 | 2.5 | 175 |
| C6 | 30 | 50 | Kraton G-1657 | 20 | 8.6 | 46.1 | 3.1 | 126 |
| C7 | 35 | 60 | Kraton C-1657 | 5 | 18.0 | 14.3 | 1.9 | 410 |
| C8 | 40 | 60 | — | — | 15.5 | 2.5 | 0.2 | 724 |

The data in Table 5 show that the polymer blends compatibilized with ES-1 according to the present invention give tougher and stiffer blends than those containing an equivalent amount of KRATON G-1657 SEBS as compatibilizer. The toughness of the blends compatibilized according to the invention is already significantly enhanced at a level of 2.5 weight percent compatibilizer and continues to be enhanced as its level is increased to 20 percent. The SEBS block-copolymer is only half as effective at a level of 2.5 percent, and its performance does not increase as its level increases. On the contrary, at 5 percent and higher of SEBS the stiffness of the blend decreases as evidenced by the decreasing modulus, which is undesired. The decrease in stiffness for the blends of the present invention is significantly less at the same amounts of compatibilizer.

EXAMPLE 2

Polymer blends were prepared from STYRON 612 general purpose polystyrene and LDPE 3 at various blending ratios for a fixed amount of compatibilizer ES-2 (invention) and without compatibilizer (comparative). The compositions of the blends as well as their properties are listed in Table 6.

TABLE 6

| | Polymer Blends | | | Tensile | Elongation | | |
| Run No. | Component (A) LDPE 3 (wt. %) | Component (B) STYRON 612 (wt. %) | Component (C) ES-2 (wt. %) | Strength (MPa) | @ Break (%) | Toughness (MPa) | Modulus (MPa) |
|---|---|---|---|---|---|---|---|
| 1 | 85 | 10 | 5 | 10.6 | 583.0 | 55.3 | 171 |
| 2 | 75 | 20 | 5 | 10.3 | 212.0 | 20.9 | 189 |
| 3 | 65 | 30 | 5 | 11.2 | 119.0 | 12.2 | 194 |
| 4 | 55 | 40 | 5 | 13.2 | 55.2 | 6.2 | 254 |
| 5 | 45 | 50 | 5 | 8.0 | 109.0 | 7.5 | 259 |
| 6 | 35 | 60 | 5 | 18.4 | 18.9 | 2.9 | 453 |
| 7 | 25 | 70 | 5 | 26.6 | 5.8 | 0.9 | 745 |
| 8 | 15 | 80 | 5 | 32.6 | 5.3 | 0.9 | 841 |
| 9 | 5 | 90 | 5 | 29.1 | 3.7 | 0.6 | 945 |
| C1 | 90 | 10 | — | 8.7 | 238.0 | 20.5 | 200 |
| C2 | 80 | 20 | — | 16.1 | 31.4 | 4.2 | 333 |
| C3 | 70 | 30 | — | 8.6 | 12.8 | 1.0 | 303 |
| C4 | 60 | 40 | — | 10.4 | 4.6 | 0.3 | 401 |
| C5 | 50 | 50 | — | 13.1 | 2.8 | 0.2 | 596 |
| C6 | 40 | 60 | — | 15.5 | 2.5 | 0.2 | 724 |
| C7 | 30 | 70 | — | 17.4 | 2.9 | 0.3 | 772 |
| C8 | 20 | 80 | — | 25.0 | 3.5 | 0.5 | 938 |
| C9 | 10 | 90 | — | 31.4 | 4.3 | 0.7 | 952 |

The data in Table 6 show that, without compatibilizer, incorporation of as little as 10 percent polystyrene in the LDPE results in a dramatic deterioration of the toughness of LDPE, leaving almost no mechanical strength at 30 percent polystyrene incorporation. With compatibilizer, the blend is toughened up to high levels of polystyrene. At levels higher than 30 percent of polystyrene the blend is significantly stiffer than the base LDPE, as evidenced by the modulus.

EXAMPLE 3

Polymer blends were prepared from STYRON 612 general purpose polystyrene and different types of olefinic polymers at various blending ratios with a compatibilizer selected from ES-2 (invention), mixtures of ES-2 and Kraton G-1657 (invention), and Kraton G-1657 (comparative) as well as without compatibilizer (comparative). The compositions of the blends as well as their properties are listed in Table 7.

TABLE 7

| Run No. | Component (A) Type | (wt. %) | Component (B) STYRON 612 (wt. %) | Compatibilizer Type | Level (%) | Tensile Strength (MPa) | Elongation @ Break (%) | Toughness (MPa) | Modulus (MPa) |
|---|---|---|---|---|---|---|---|---|---|
| 1 | SLOP 2 | 40 | 50 | ES-2 | 10 | 20.1 | 37.7 | 6.7 | 419 |
| 2 | SLOP 1 | 40 | 50 | ES-2 | 10 | 14.4 | 49.4 | 6.2 | 262 |
| 3 | SLOP 3 | 40 | 50 | ES-2 | 10 | 12.0 | 148.0 | 15.9 | 191 |
| 4 | SLOP 2 | 15 | 80 | ES-2 | 5 | 20.9 | 4.4 | 0.5 | 632 |
| 5 | SLOP 3 | 15 | 80 | ES-2 | 5 | 25.1 | 5.7 | 0.8 | 658 |
| 6 | HDPE 2 | 40 | 50 | ES-2 | 10 | 23.9 | 31.9 | 6.8 | 526 |
| 7 | HDPE 4 | 40 | 50 | ES-2 | 10 | 26.3 | 11.2 | 2.3 | 697 |
| 8 | HDPE 2 | 30 | 65 | ES-2 | 5 | 31.9 | 8.5 | 1.8 | 883 |
| 9 | HDPE 2 | 30 | 65 | 4 ES-2/1 Kraton G-1657 | 5 | 28.3 | 6.9 | 1.3 | 952 |
| 10 | HDPE 2 | 30 | 65 | 2.5 ES-2/ 2.5 Kraton G-1657 | 5 | 27.7 | 7.5 | 1.4 | 883 |
| 11 | HDPE 2 | 30 | 65 | 1 ES-2/4 Kraton G-1657 | 5 | 26.3 | 8.7 | 1.7 | 862 |
| 12 | EP 1 | 35 | 60 | ES-2 | 5 | 21.9 | 3.9 | 0.5 | 828 |
| 13 | EP 2 | 40 | 50 | ES-2 | 10 | 25.3 | 8.4 | 1.5 | 759 |
| C1 | SLOP 2 | 50 | 50 | — | — | 17.2 | 4.1 | 0.4 | 594 |
| C2 | SLOP 1 | 50 | 50 | — | — | 10.9 | 3.7 | 0.2 | 446 |
| C3 | SLOP 3 | 50 | 50 | — | — | 5.2 | 11.4 | 0.5 | 143 |
| C4 | SLOP 2 | 20 | 80 | — | — | 25.4 | 3.3 | 0.4 | 890 |
| C5 | SLOP 3 | 20 | 80 | — | — | 21.0 | 3.3 | 0.7 | 779 |
| C6 | HDPE 2 | 50 | 50 | — | — | 21.7 | 3.4 | 0.4 | 828 |
| C7 | HDPE 4 | 50 | 50 | — | — | 27.7 | 4.7 | 0.8 | 793 |
| C8 | HDPE 2 | 30 | 65 | Kraton G-1657 | 5 | 21.5 | 11.1 | 1.8 | 814 |
| C9 | EP 2 | 50 | 50 | — | — | 23.2 | 3.8 | 0.5 | 821 |

The data in Table 7 show that at an amount of 10% ES compatibilizer, blends having superior toughness are obtained. A lower density SLOP results in a blend that is more ductile but of lower modulus. The blend of intermediate density SLOP 2 is fairly tough and stiff. Addition of 5% ES compatibilizer to PS-rich (80% PS) blends has a relatively small effect on the toughness. At that high PS level, the PS resin apparently forms a continuous phase.

Properly toughened HDPE/PS and EP/PS blends are of high interest since the blends would combine rigidity and a high heat distortion temperature. 10% of ES compatibilizer renders HDPE/PS blends an elongation greater than 10%. For a PS-rich blends (65% PS), 5% of ES compatibilizer appears to be insufficient with an elongation less than 10%. A three-fold enhancement of the toughness is achieved by incorporation of 10% ES compatibilizer into a 50%-PS HDPE/PS blend.

EXAMPLE 4

Polymer blends were prepared from different types of monovinylidene aromatic polymers and different types of olefinic polymers in various ratios with compatibilizer ES-2 or ES-3 (invention) and without compatibilizer (comparative). The compositions of the blends as well as their properties are listed in Table 8.

TABLE 8

| Run No. | Component (A) Type | (wt. %) | Component (B) Type | (wt. %) | Component (C) Type | Level (%) | Tensile Strength (MPa) | Elongation @ Break (%) | Toughness (MPa) | Modulus (MPa) |
|---|---|---|---|---|---|---|---|---|---|---|
| 1 | LDPE 3 | 40 | STYRON 663 | 50 | ES-2 | 10 | 16.6 | 49.3 | 6.62 | 287 |
| 2 | LDPE 3 | 40 | CPPS 4 | 50 | ES-2 | 10 | 15.9 | 49.9 | 6.97 | 328 |
| 3 | LDPE 3 | 40 | SBA | 50 | ES-2 | 10 | 15.5 | 34.3 | 4.74 | 395 |
| 4 | LDPE 3 | 40 | PVT | 50 | ES-2 | 10 | 13.9 | 25.6 | 2.90 | 309 |
| 5 | LDPE 3 | 40 | SAN 111 | 50 | ES-2 | 10 | 14.8 | 8.7 | 0.86 | 364 |
| 6 | HDPE 2 | 45 | SPS 1 | 50 | ES-2 | 5 | 20.6 | 3.4 | 0.46 | 841 |
| 7 | HDPE 2 | 30 | STYRON 663 | 65 | ES-3 | 5 | 23.3 | 4.8 | 0.65 | 766 |
| 8 | HDPE 2 | 30 | STYRON 612 | 65 | ES-3 | 5 | 27.2 | 5.6 | 0.91 | 841 |
| 9 | HDPE 2 | 30 | GPPS 4 | 65 | ES-3 | 5 | 32.6 | 5.8 | 1.12 | 1028 |
| 10 | HDPE 2 | 30 | GPPS 5 | 65 | ES-3 | 5 | 24.6 | 3.5 | 0.47 | 1028 |
| 11 | HDPE 2 | 60 | STYRON 663 | 35 | ES-3 | 5 | 20.9 | 12.0 | 1.91 | 675 |
| 12 | HDPE 2 | 60 | GPPS 5 | 35 | ES-3 | 5 | 22.8 | 11.6 | 2.10 | 697 |
| 13 | HDPE 2 | 60 | GPPS 4 | 35 | ES-3 | 5 | 22.8 | 25.7 | 5.41 | 752 |

TABLE 8-continued

| | Component (A) | | Component (B) | | Component (C) | | Tensile Strength | Elongation @ Break | Toughness | Modulus |
|---|---|---|---|---|---|---|---|---|---|---|
| Run No. | Type | (wt. %) | Type | (wt. %) | Type | Level (%) | (MPa) | (%) | (MPa) | (MPa) |
| 14 | HDPE 2 | 60 | STYRON 612 | 35 | ES-3 | 5 | 21.0 | 14.6 | 2.43 | 613 |
| C1 | LDPE 3 | 50 | STYRON 663 | 50 | — | — | 11.1 | 3.6 | 0.23 | 461 |
| C2 | LDPE 3 | 50 | CPPS 4 | 50 | — | — | 12.6 | 3.2 | 0.23 | 512 |
| C3 | LDPE 3 | 50 | SBA | 50 | — | — | 14.8 | 3.7 | 0.30 | 557 |
| C4 | LDPE 3 | 50 | PVT | 50 | — | — | 10.7 | 3.3 | 0.19 | 431 |
| C5 | LDPE 3 | 50 | SAN 111 | 50 | — | — | 12.6 | 3.0 | 0.23 | 563 |
| C6 | HDPE 2 | 50 | SPS 1 | 50 | — | — | 17.1 | 2.2 | 0.21 | 876 |

In Table 8 the effects of the chemical composition of styrenic polymers on the blend properties were investigated. The blend properties are not severely affected by the presence of butyl acrylate comonomer (SBA) or p-methyl styrene (PVT) groups in the molecular structure. Both LDPE/SBA and LDPE/PVT blends compatibilized with ES have a satisfactory toughness and stiffness. The LDPE/SAN blend is not as well compatibilized as these blends. The compatibilized LDPE/SAN blend is, however, about four times as tough as the uncompatibilized blend.

EXAMPLE 5

Polymer blends were prepared from STYRON 612 general purpose polystyrene and LDPE and HDPE polymers at various blending ratios with several different compatibilizers according to the invention. The compositions of the blends as well as their properties are listed in Tables 9 and 10.

TABLE 9

| | Component (A) | Component (B) | Component (C) | | Tensile Strength | Elongation @ Break | Toughness | Modulus |
|---|---|---|---|---|---|---|---|---|
| Run No. | LDPE 3 (wt. %) | STYRON 612 (wt. %) | Type | Wt. (%) | (MPa) | (%) | (MPa) | (MPa) |
| 1 | 40 | 50 | ES-4 | 10 | 14.6 | 9.1 | 0.9 | 431 |
| 2 | 40 | 50 | ES-5 | 10 | 15.2 | 18.5 | 2.3 | 366 |
| 3 | 40 | 50 | ES-6 | 10 | 14.6 | 18.0 | 2.2 | 352 |
| 4 | 40 | 50 | ES-3 | 10 | 16.6 | 25.1 | 3.4 | 381 |
| 5 | 40 | 50 | ES-7 | 10 | 15.9 | 30.0 | 4.0 | 337 |
| 6 | 40 | 50 | ES-1 | 10 | 18.1 | 39.5 | 6.1 | 322 |
| 7 | 40 | 50 | ES-8 | 10 | 16.8 | 9.0 | 1.1 | 456 |
| 8 | 40 | 50 | ES-9 | 10 | 9.9 | 40.2 | 3.9 | 326 |
| 9 | 40 | 50 | ES-10 | 10 | 14.3 | 34.1 | 4.4 | 356 |
| 10 | 40 | 50 | ES-11 | 10 | 17.8 | 7.8 | 0.9 | 445 |
| 11 | 40 | 50 | ES-12 | 10 | 15.5 | 5.3 | 0.5 | 423 |
| 12 | 40 | 50 | ES-13 | 10 | 18.5 | 4.8 | 0.6 | 611 |
| 13 | 30 | 60 | ES-13 | 10 | 17.0 | 3.0 | 0.3 | 731 |

TABLE 10

Polymer Blends

| Run No. | Component (A) HDPE 2 (wt. %) | Component (B) STYRON 612 (wt. %) | Component (C) Type | Wt. (%) | Tensile Strength (MPa) | Elongation @ Break (%) | Toughness (MPa) | Modulus (MPa) |
|---|---|---|---|---|---|---|---|---|
| 1 | 60 | 30 | ES-4 | 10 | 18.1 | 16.6 | 2.6 | 578 |
| 2 | 60 | 30 | ES-5 | 10 | 19.4 | 19.5 | 3.3 | 575 |
| 3 | 60 | 30 | ES-6 | 10 | 17.6 | 28.2 | 4.7 | 543 |
| 4 | 60 | 30 | ES-3 | 10 | 17.3 | 39.1 | 6.9 | 512 |
| 5 | 60 | 30 | ES-7 | 10 | 16.1 | 41.4 | 6.9 | 473 |
| 6 | 60 | 30 | ES-8 | 10 | 15.9 | 35.2 | 6.2 | 495 |
| 7 | 60 | 30 | ES-9 | 10 | 8.9 | 807.0 | 77.2 | 447 |
| 8 | 60 | 30 | ES-10 | 10 | 13.9 | 179.0 | 24.9 | 521 |
| 9 | 60 | 30 | ES-11 | 10 | 19.8 | 31.1 | 5.9 | 501 |
| 10 | 60 | 30 | ES-12 | 10 | 22.4 | 30.4 | 6.2 | 509 |
| 11 | 60 | 30 | ES-13 | 10 | 20.9 | 37.1 | 8.7 | 802 |
| 12 | 60 | 35 | ES-5 | 5 | 21.6 | 12.2 | 2.0 | 703 |
| 13 | 60 | 35 | ES-3 | 5 | 21.0 | 14.6 | 2.4 | 613 |
| 14 | 60 | 35 | ES-7 | 5 | 21.4 | 23.6 | 4.4 | 652 |
| 15 | 60 | 35 | ES-9 | 5 | 19.7 | 34.0 | 6.4 | 622 |
| 16 | 30 | 60 | ES-4 | 10 | 21.3 | 5.0 | 0.7 | 814 |
| 17 | 30 | 60 | ES-5 | 10 | 25.7 | 6.2 | 1.1 | 786 |
| 18 | 30 | 60 | ES-6 | 10 | 28.3 | 7.3 | 1.3 | 855 |
| 19 | 30 | 60 | ES-3 | 10 | 29.2 | 8.0 | 1.5 | 855 |
| 20 | 30 | 60 | ES-7 | 10 | 27.5 | 10.0 | 2.0 | 786 |
| 21 | 30 | 60 | ES-8 | 10 | 30.3 | 6.9 | 1.4 | 716 |
| 22 | 30 | 60 | ES-9 | 10 | 27.9 | 12.8 | 2.8 | 793 |
| 23 | 30 | 60 | ES-10 | 10 | 26.2 | 12.4 | 2.7 | 745 |
| 24 | 30 | 60 | ES-11 | 10 | 32.3 | 6.6 | 1.3 | 694 |
| 25 | 30 | 60 | ES-12 | 10 | 33.0 | 7.2 | 1.5 | 729 |
| 26 | 30 | 60 | ES-13 | 10 | 31.4 | 5.0 | 0.9 | 917 |
| 27 | 35 | 60 | ES-3 | 5 | 25.1 | 5.5 | 0.8 | 786 |
| 28 | 25 | 65 | ES-3 | 10 | 31.2 | 6.8 | 1.3 | 876 |

The data in Tables 9 and 10 show that for blends of LDPE or HDPE with GPPS, ES compatibilizers with a styrene content of approximately 15–35 mole % are preferred. The optimum compatibilizer differed slightly among blends. For an LDPE/PS blend, an ES resin having about 20 mole % styrene was the most effective. An ES resin having 25 mole percent styrene (ES-9) performs the best for HDPE-rich HDPE/PS blends. The HDPE 2/STYRON 612/ES-9: 60/30/10 blend stands out with its remarkably high elongation and toughness. Like a HDPE resin, the blend developed necking during the tensile elongation tests.

EXAMPLE 6

Polymer blends especially suitable for producing liners, such as for refrigerators, and films, such as for labels, were prepared from several high-impact polystyrenes and LDPE and HDPE polymers at various blending ratios with several different pseudo-random interpolymer compatibilizers (invention). Comparison runs were also made with several block-copolymers as a compatibilizer. The compositions of the blends as well as their properties are listed in Table 11.

TABLE 11

| Run No. | Component (A) Type | Wt. (%) | Component (B) Type | Wt. (%) | Component (C) Type | Wt. (%) | Tensile Strength (MPa) | Elongation @ Break (%) | Toughness (MPa) | Modulus (MPa) |
|---|---|---|---|---|---|---|---|---|---|---|
| 1 | HDPE 3 | 35 | HIPS STYRON 404 | 55 | ES-8 | 10 | 17.4 | 25.2 | 4.1 | 522 |
| 2 | HDPE 2 | 35 | HIPS STYRON 404 | 55 | ES-9 | 10 | 16.9 | 39.0 | 6.1 | 491 |
| 3 | HDPE 3 | 35 | HIPS STYRON 404 | 55 | ES-9 | 10 | 15.4 | 40.0 | 6.0 | 585 |
| 4 | HDPE 3 | 35 | HIPS STYRON 404 | 55 | ES-10 | 10 | 17.6 | 47.2 | 8.0 | 534 |
| 5 | HDPE 3 | 35 | HIPS STYRON 404 | 55 | ES-11 | 10 | 19.3 | 25.7 | 4.6 | 547 |
| 6 | HDPE 3 | 35 | HIPS STYRON 404 | 55 | ES-12 | 10 | 22.1 | 32.1 | 6.5 | 522 |
| 7 | HDPE 3 | 35 | HIPS STYRON 404 | 55 | ES-13 | 10 | 22.2 | 14.5 | 2.9 | 724 |
| 8 | HDPE 1 | 35 | HIPS STYRON 404 | 55 | ES-10 | 10 | 17.2 | 56.4 | 9.3 | 545 |
| 9 | HDPE 4 | 35 | HIPS STYRON 404 | 55 | ES-10 | 10 | 18.5 | 94.6 | 16.5 | 552 |
| 10 | LDPE 681i | 60 | HIPS STYRON 478 | 30 | ES-7 | 10 | 9.2 | 166.0 | 13.9 | 141 |
| 11 | LDPE 681i | 60 | HIPS STYRON 478 | 30 | ES-8 | 10 | 5.7 | 115.0 | 8.4 | 161 |
| 12 | LDPE 681i | 60 | HIPS STYRON 478 | 30 | ES-10 | 10 | 7.6 | 227.0 | 17.1 | 156 |
| 13 | LDPE 681i | 60 | HIPS STYRON 478 | 30 | ES-11 | 10 | 5.2 | 34.3 | 2.3 | 178 |
| 14 | LDPE 681i | 60 | HIPS STYRON 478 | 30 | ES-12 | 10 | 7.2 | 29.3 | 1.9 | 151 |
| 15 | LDPE 681i | 60 | HIPS STYRON 478 | 30 | ES-13 | 10 | 9.0 | 25.6 | 2.2 | 252 |
| C1 | HDPE 2 | 35 | HIPS STYRON 404 | 55 | Vector 6241-D | 10 | 18.4 | 46.5 | 8.1 | 480 |
| C2 | HDPE 3 | 35 | HIPS STYRON 404 | 55 | Vector | 10 | 17.2 | 44.6 | 7.2 | 510 |

TABLE 11-continued

| Run No. | Component (A) Type | Wt. (%) | Component (B) Type | Wt. (%) | Component (C) Type | Wt. (%) | Tensile Strength (MPa) | Elongation @ Break (%) | Toughness (MPa) | Modulus (MPa) |
|---|---|---|---|---|---|---|---|---|---|---|
| C3 | HDPE 3 | 35 | HIPS STYRON 404 | 55 | 6241-D Kraton G-1657 | 10 | 13.9 | 31.3 | 4.1 | 463 |
| C4 | HDPE 3 | 45 | HIPS STYRON 404 | 55 | — | — | 17.4 | 3.3 | 0.4 | 697 |
| C5 | LDPE 681i | 60 | HIPS STYRON 478 | 30 | Stereon 840A | 10 | 8.1 | 82.3 | 6.0 | 121 |
| C6 | LDPE 681i | 70 | HIPS STYRON 478 | 30 | — | — | 5.8 | 113.0 | 8.0 | 196 |

An ES resin having 26.5 mole % styrene (ES-10) was found to be the most effective compatibilizer for all PE/HIPS blends. In a HDPE 3/STYRON 404 HIPS: 35/55 blend this compatibilizer performs as well as or better than the Vector 6241-D SBS in both the toughness and modulus, and superior to an SEBS copolymer. In a LDPE/HIPS: 60/30 blend, several ES copolymers with 18–27 mole % styrene outperformed the SB block copolymer. Since styrene-butadiene block copolymers lack thermal and UV stability, ES copolymers are attractive for these applications. Replacing the HDPE resin with one having a high molecular weight tends to improve the properties.

EXAMPLE 7

Weatherable polymer blends were prepared from STYRON 612 general purpose polystyrene and LDPE and HDPE polymers at various blending ratios with several different pseudo-random interpolymer compatibilizer (invention) and with several block-copolymers (comparative). The compositions of the blends as well as their properties are listed in Table 12.

lized with ES copolymers having 18–25 mole % styrene.

EXAMPLE 8

Polymer blends were prepared from syndiotactic polystyrene SPS 2 and a high molecular weight rubber-modified polypropylene PROFAX™ SD 613 at various blending ratios with several pseudo-random ES interpolymer compatibilizers (invention) and with block-copolymers (comparative). The composition of the blends as well as their properties are listed in Table 13. The components as well as 0.25% Irganox 1010 and 0.25% Irgafos 168 antioxidants were mixed for 10 minutes in 40 g batches in a Brabender batch mixer operated at 60 rpm and 260° C.

The blends were cooled and ground to powder in a Wiley mill and subsequently compression molded into small micro tensile bars having the dimensions of 0.130 inch (0.33 cm)×0.183 inch (0.46 cm)×0.75 inch (1.8 cm) (gauge length). A compression molding cycle of 2 min/10 min/2 min for preheat/pressure/cool was used at a molding temperature of 300° C. Tensile yield and tensile modulus were

TABLE 12

| Run No. | Component (A) Type | Wt. (%) | Component (B) SYTRON 612 (wt. %) | Component (C) Type | Wt. (%) | Tensile Strength (MPa) | Elongation @ Break (%) | Toughness (MPa) | Modulus (MPa) |
|---|---|---|---|---|---|---|---|---|---|
| 1 | LDPE 3 | 40 | 50 | ES-7 | 10 | 15.9 | 30.0 | 4.0 | 337 |
| 2 | LDPE 3 | 40 | 50 | ES-1 | 10 | 18.1 | 39.5 | 6.1 | 322 |
| 3 | LDPE 3 | 40 | 50 | ES-9 | 10 | 9.9 | 40.2 | 3.9 | 326 |
| 4 | LDPE 132i | 40 | 50 | ES-9 | 10 | 13.9 | 18.2 | 2.2 | 445 |
| 5 | HDPE 2 | 60 | 30 | ES-9 | 10 | 8.9 | 807.0 | 77.2 | 447 |
| 6 | HDPE 2 | 60 | 35 | ES-9 | 5 | 19.7 | 34.0 | 6.4 | 622 |
| 7 | HDPE 2 | 35 | 55 | ES-9 | 10 | 24.5 | 16.8 | 3.3 | 745 |
| 8 | HDPE 3 | 35 | 55 | ES-9 | 10 | 22.8 | 12.5 | 2.3 | 665 |
| C1 | LDPE 3 | 40 | 50 | Vector 6241-D | 10 | 13.4 | 19.0 | 2.0 | 330 |
| C2 | LDPE 3 | 40 | 50 | Kraton G-1657 | 10 | 8.0 | 36.6 | 2.4 | 132 |
| C3 | LDPE 132i | 40 | 50 | Vector 6241-D | 10 | 13.7 | 18.2 | 2.2 | 445 |
| C4 | HDPE 2 | 60 | 30 | Vector 6241-D | 10 | 12.8 | 84.5 | 12.7 | 448 |
| C5 | HDPE 2 | 60 | 30 | Kraton G-1657 | 10 | 8.9 | 77.8 | 8.1 | 372 |
| C6 | HDPE 2 | 70 | 30 | — | — | 9.5 | 9.8 | 1.4 | 532 |
| C7 | RDPE 2 | 60 | 35 | Vector 6241-D | 5 | 21.2 | 34.1 | 6.3 | 628 |
| C8 | HDPE 2 | 60 | 35 | Kraton G-1657 | 5 | 18.1 | 15.3 | 2.1 | 536 |
| C9 | HDPE 2 | 35 | 55 | Vector 6241-D | 10 | 25.2 | 33.7 | 7.1 | 685 |
| C10 | HDPE 3 | 35 | 55 | Vector 6241-D | 10 | 22.5 | 27.5 | 5.3 | 601 |

Weatherable polymer blends can be produced from a GPPS resin and a polyethylene resin by using an ES copolymer as the compatibilizer. In blends containing 50% or less polystyrene, an ES resin consistently outperformed a saturated SEBS block copolymer, and, in general, outperformed an SBS tri-block copolymer.

All these GPPS-based blends are effectively compatibidetermined at 23° C. and at a rate of 0.13 cm/min (0.05 inch/min). The Notched Izod was determined by cutting and notching (0.25 mm (10 mil) notch radius) the micro bars and impacting them at 23° C.

The data in Table 13 show that the blends according to the invention have better stiffness (modulus) than the blends containing an equivalent amount of Kraton G1652, while still improving the ductility (%E) and toughness (Izod).

TABLE 13

| Run No. | SPS (Wt. %) | PP (Wt. %) | Compatibilizer (Wt. %) | Compatibilizer | Tensile Yield (MPa) | (%) E | Izod (J/m) | Modulus (MPa) |
|---|---|---|---|---|---|---|---|---|
| 1 | 22.5 | 67.5 | 10 | ES-14 | 12.5 | 12.6 | 26.7 | 1457 |
| 2 | 22.5 | 67.5 | 10 | ES-15 | 11.7 | 5.3 | 58.7 | 1303 |
| 3 | 22.5 | 67.5 | 10 | ES-16 | 11.4 | 3.4 | 52.3 | 1484 |
| 4 | 22.5 | 67.5 | 10 | ES-17 | 12.2 | 4.8 | 43.2 | 1383 |
| 5 | 22.5 | 67.5 | 10 | ES-18 | 12.2 | 7.2 | 51.2 | 1372 |
| 6 | 67.5 | 22.5 | 10 | ES-14 | 11.3 | 0.6 | 9.6 | 2270 |
| 7 | 67.5 | 22.5 | 10 | ES-16 | 11.3 | 0.6 | — | 2304 |
| 8 | 67.5 | 22.5 | 10 | ES-18 | 12.4 | 0.6 | — | 2439 |
| 9 | 24.6 | 73.9 | 2.5 | ES-16 | 13.1 | 6.7 | — | 1623 |
| 10 | 23.8 | 71.2 | 5.0 | ES-16 | 12.8 | 6.4 | — | 1400 |
| 11 | 20 | 60 | 20 | ES-16 | 11.9 | 11.1 | 133.1 | 908 |
| 12 | 20 | 60 | 10/10 | Es-16 + Kraton G1652 | 12.4 | 11.8 | — | 762 |
| C1 | 25 | 75 | — | — | 15.3 | 3.4 | 31.0 | 1979 |
| C2 | 75 | 25 | — | — | 13.0 | 0.5 | 8.0 | 3293 |
| C3 | 22.5 | 67.5 | 10 | Kraton G1652 | 12.8 | 12.9 | 14.7 | 951 |
| C4 | 67.5 | 22.5 | 10 | Kraton G1652 | 14.9 | 0.9 | 18.7 | 2170 |

What is claimed is:

1. A polymer blend composition comprising:
  (a) from 0.5 to 99 percent by weight, based on the total weight of (a), (b), and (c), of an aliphatic α-olefin homopolymer or interpolymer, or an interpolymer of an aliphatic α-olefin and a non-aromatic monomer interpolymerizable therewith;
  (b) from 0.5 to 99 percent by weight, based on the total weight of (a), (b), and (c), of a homopolymer or interpolymer of monovinylidene aromatic monomers, or an interpolymer of monovinylidene aromatic monomer and a monomer interpolymerizable therewith other than an aliphatic α-olefin; and
  (c) from 0.5 to 99 percent by weight, based on the total weight of (a), (b), and (c), of a substantially random interpolymer comprising an aliphatic α-olefin and a vinylidene aromatic monomer.

2. The composition of claim 1 wherein (a) comprises a homopolymer or interpolymer of an α-olefin having from 2 to 18 carbon atoms.

3. The composition of claim 2 wherein (a) is a homopolymer of ethylene or propylene, or an interpolymer of ethylene and one or more α-olefins having from 3 to 8 carbon atoms.

4. The composition of claim 1 comprising from 90 to 20 percent by weight of (a).

5. The composition of claim 1 wherein the monovinylidene aromatic monomer of (b) is represented by the following formula:

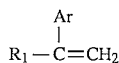

wherein $R_1$ is selected from the group of radicals consisting of hydrogen and alkyl radicals containing three carbons or less, and Ar is a phenyl group or a phenyl group substituted with from 1 to 5 substituents selected from the group consisting of $C_{1-4}$-alkyl and $C_{1-4}$-haloalkyl.

6. The composition of claim 1 wherein the interpolymerizable monomer of (b) is selected from the group consisting of N-phenyl maleimide, acrylamide, acrylonitrile, methacrylonitrile, maleic anhydride, acrylic acid, $C_{1-4}$-alkyl acrylates or -methacrylates.

7. The composition of claim 5 wherein (b) comprises polystyrene, rubber-modified high impact polystyrene, poly(vinyl-toluene), or poly(α-methylstyrene).

8. The composition of claim 1 comprising from 10 to 80 percent by weight of (b).

9. The composition of claim 1 wherein the substantially random interpolymer component (c) is a pseudo-random linear or substantially linear interpolymer comprising an aliphatic α-olefin and a monovinylidene aromatic monomer.

10. The composition of claim 9 wherein the α-olefin has from 2 to 8 carbon atoms and the monovinylidene aromatic monomer is represented by the following formula:

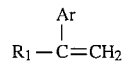

wherein $R_1$ is selected from the group of radicals consisting of hydrogen and alkyl radicals containing three carbons or less, and Ar is a phenyl group or a phenyl group substituted with from 1 to 5 substituents selected from the group consisting of $C_{1-4}$-alkyl and $C_{1-4}$-haloalkyl.

11. The composition of claim 10 wherein the α-olefin is ethylene and the monovinylidene aromatic monomer is styrene.

12. The composition of claim 11 wherein the pseudo-random interpolymer contains from 1 to less than 55 mole percent of the monovinylidene aromatic monomer.

13. The composition of claim 12 wherein the pseudo-random interpolymer contains from 3 to 50 mole percent of the monovinylidene aromatic monomer.

14. The composition of claim 13 wherein the pseudo-random interpolymer contains from 15 to 35 mole percent of the monovinylidene aromatic monomer.

15. The composition of claim 1 wherein the substantially random interpolymer has a melt index of from 0.01 to 100.

16. The composition of claim 15 wherein the substantially random interpolymer has a melt index of from 0.01 to 25.

17. The composition of claim 1 comprising from 1 to 50 percent by weight of (c).

18. The composition of claim 1 comprising from 35 to 75 weight percent of (a), from 15 to 60 weight percent of (b), and from 2 to 20 weight percent of (c).

19. The composition of claim 18 wherein (a) is selected from the group consisting of low density polyethylene, high density polyethylene, substantially linear polyethylene, linear low density polyethylene, and polypropylene, and (b) is selected from the group consisting of styrene homopolymer, rubber modified high impact polystyrene, poly(vinyl-toluene), and poly($\alpha$-methylstyrene).

20. The composition of claim 9 comprising from 40 to 87 weight percent of (a), from 11 to 40 weight percent of syndiotactic polystyrene as (b), and from 2 to 20 weight percent of (c).

21. The composition of claim 20 wherein (a) comprises polypropylene.

22. An expandable composition comprising a polymer blend composition according to claim 1 and an expanding agent.

23. The expandable composition of claim 22 in the form of beads.

24. Foamed composition obtained by subjecting the expandable composition of claim 22 to a foaming process.

25. Foamed composition of claim 24 in the form of a sheet or plank.

26. An article of manufacture molded from the polymer blend composition according to claim 1.

27. The article of manufacture of claim 26 obtained by thermoforming, extrusion, injection molding, or blow molding.

28. The article of manufacture of claim 27 in the form of a sheet or film.

29. Method of packaging a substance or article by providing an intimate blend of components (a), (b), and (c) of a polymer blend composition of claim 1 and providing the blend in the form of an enclosure around a substance or article.

30. The method of claim 29 wherein the blend is formed into a sheet or film and the substance or article to be packaged is food.

31. The method of claim 29 wherein the blend is formed into a container and the substance or article to be packaged is a liquid.

* * * * *